(12) United States Patent
Coe et al.

(10) Patent No.: US 8,447,578 B2
(45) Date of Patent: May 21, 2013

(54) METHOD OF DESIGNING A TIRE HAVING A TARGET RESIDUAL ALIGNING TORQUE

(75) Inventors: Scott J. Coe, Akron, OH (US); Ryan L. Kupchella, Akron, OH (US); Brian D. Steenwyk, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 615 days.

(21) Appl. No.: 12/436,298

(22) Filed: May 6, 2009

(65) Prior Publication Data

US 2009/0281773 A1 Nov. 12, 2009

Related U.S. Application Data

(60) Provisional application No. 61/051,146, filed on May 7, 2008.

(51) Int. Cl.
*G06G 7/48* (2006.01)
*B60C 11/01* (2006.01)
*B60C 11/03* (2006.01)
*G01M 9/06* (2006.01)

(52) U.S. Cl.
USPC ........... 703/8; 703/7; 152/209.16; 152/209.3; 73/146

(58) Field of Classification Search
USPC ........... 703/7, 8; 152/209.18, 209.14, 209.16, 152/209.23; 73/8, 45, 6, 49, 146
See application file for complete search history.

(56) References Cited

U.S. PATENT DOCUMENTS

| | | | |
|---|---|---|---|
| 2,303,164 A | 11/1942 | Hawkinson | |
| 4,155,393 A | 5/1979 | Grawey | |
| 4,265,287 A | 5/1981 | Abe et al. | |
| 4,777,993 A * | 10/1988 | Yamashita et al. | 152/209.3 |
| 4,915,150 A | 4/1990 | Takusagawa et al. | |
| 5,014,762 A * | 5/1991 | Beer et al. | 152/532 |
| 5,225,012 A * | 7/1993 | Narahara et al. | 152/526 |
| 5,321,628 A * | 6/1994 | Beebe | 700/279 |
| 5,482,099 A * | 1/1996 | Kajiwara et al. | 152/209.1 |
| 5,647,926 A * | 7/1997 | van der Meer et al. | 152/209.18 |
| 5,669,993 A * | 9/1997 | Moseley et al. | 152/209.1 |
| 5,710,718 A * | 1/1998 | Kamegawa et al. | 703/1 |
| 5,714,026 A | 2/1998 | Wakabayashi | |
| 5,723,768 A * | 3/1998 | Ammon | 73/8 |
| 5,733,393 A * | 3/1998 | Hubbell et al. | 152/209.5 |
| 5,773,717 A * | 6/1998 | Reinhardt et al. | 73/146 |
| 5,789,668 A * | 8/1998 | Coe et al. | 73/146 |
| 5,798,124 A * | 8/1998 | Howald et al. | 425/32 |

(Continued)

FOREIGN PATENT DOCUMENTS

| | | | |
|---|---|---|---|
| EP | 761479 A2 * | 3/1997 | |
| JP | 04100706 A * | 4/1992 | |

(Continued)

*Primary Examiner* — Akash Saxena
(74) *Attorney, Agent, or Firm* — Shaun J. Fox; Bryan Jaketic (57) ABSTRACT

A method of designing a tire, wherein a tire designer identifies a target residual aligning torque range for a tire design and creates a computer model of the tire, including a buttress angle. Further, the method includes calculating the residual aligning torque of the modeled tire and comparing the calculated residual aligning torque value to the target residual aligning torque to determine whether the calculated residual aligning torque value is within the target residual aligning torque range. The method produces a final tire design having a target residual aligning torque.

20 Claims, 5 Drawing Sheets

U.S. PATENT DOCUMENTS

| | | | |
|---|---|---|---|
| 5,820,796 A | 10/1998 | Howald et al. | |
| 5,833,779 A * | 11/1998 | van der Meer et al. | 152/209.15 |
| 5,944,082 A * | 8/1999 | Thompson et al. | 152/209.8 |
| 5,960,845 A * | 10/1999 | Wada | 152/209.23 |
| 6,083,268 A * | 7/2000 | Kelsey et al. | 703/7 |
| 6,123,130 A * | 9/2000 | Himuro et al. | 152/209.3 |
| 6,230,112 B1 | 5/2001 | Ishiyama | |
| D444,428 S | 7/2001 | Hutz et al. | |
| 6,405,772 B1 * | 6/2002 | Suzuki et al. | 152/209.15 |
| 6,473,682 B1 * | 10/2002 | Nakamura | 701/74 |
| 6,531,012 B2 * | 3/2003 | Ishiyama | 156/110.1 |
| 6,609,548 B2 | 8/2003 | Kousaie et al. | |
| 6,697,772 B2 | 2/2004 | Mancosu et al. | |
| 6,725,168 B2 * | 4/2004 | Shiraishi et al. | 702/81 |
| 6,754,615 B1 * | 6/2004 | Germann et al. | 703/8 |
| 6,920,906 B2 | 7/2005 | Allison et al. | |
| 7,077,181 B2 | 7/2006 | Hirai | |
| 7,090,735 B2 * | 8/2006 | Neugebauer et al. | 156/110.1 |
| 7,203,603 B2 | 4/2007 | Bertrand | |
| 7,308,390 B2 | 12/2007 | Shiraishi | |
| 7,483,821 B2 * | 1/2009 | Miyashita et al. | 703/8 |
| 7,707,876 B2 * | 5/2010 | Miyoshi | 73/146 |
| 7,908,128 B2 * | 3/2011 | Shiraishi | 703/7 |
| 2002/0177976 A1 | 11/2002 | Shiraishi | |
| 2003/0024621 A1 * | 2/2003 | Neugebauer et al. | 152/209.22 |
| 2003/0029535 A1 * | 2/2003 | Neugebauer et al. | 152/110 |
| 2004/0158414 A1 | 8/2004 | Bertrand | |
| 2005/0051250 A1 | 3/2005 | Gojo | |
| 2005/0065666 A1 * | 3/2005 | Miyashita et al. | 701/1 |
| 2005/0065698 A1 * | 3/2005 | Bertrand | 701/80 |
| 2005/0269004 A1 | 12/2005 | Miyabe et al. | |
| 2006/0032566 A1 * | 2/2006 | Koya | 152/209.18 |
| 2006/0116855 A1 | 6/2006 | Yamamoto et al. | |
| 2007/0056664 A1 | 3/2007 | Suzuki | |
| 2008/0059134 A1 * | 3/2008 | Miyashita et al. | 703/8 |
| 2008/0154561 A1 * | 6/2008 | Shiraishi | 703/8 |
| 2009/0265135 A1 * | 10/2009 | Hetzel | 702/182 |
| 2009/0281773 A1 * | 11/2009 | Coe et al. | 703/1 |
| 2009/0292515 A1 * | 11/2009 | Fevrier et al. | 703/6 |
| 2010/0236695 A1 * | 9/2010 | Lamontia et al. | 156/123 |

FOREIGN PATENT DOCUMENTS

| | | |
|---|---|---|
| JP | 2001-9838 A | 1/2001 |
| JP | 2004189205 A * | 7/2004 |
| JP | 2005104385 A * | 4/2005 |
| KR | 10-2006-0014587 A | 2/2006 |

* cited by examiner

METHOD OF DESIGNING A TIRE HAVING A TARGET RESIDUAL ALIGNING TORQUE

CROSS-REFERENCE TO RELATED APPLICATIONS

This application claims priority from U.S. Provisional Patent Application No. 61/051,146, filed on May 7, 2008, which is incorporated by reference herein in its entirety.

FIELD OF INVENTION

The present application is directed to a tire design method. More particularly, the present application is directed to a method of designing a tire having a target residual aligning torque.

BACKGROUND

Residual aligning torque is a moment produced on a tire tread at the footprint with the roadway that causes a twisting force on the tire when the lateral force equals zero. Original Equipment Manufacturers ("OEM's") of automobiles and trucks specify a range of acceptable residual aligning torque that tires must meet to satisfy OEM's new tire programs. During tire design, designers use finite element analysis programs to calculate a tire's residual aligning torque. U.S. Pat. No. 6,083,268, hereby incorporated by reference in its entirety, discloses a design method in association with a finite element analysis to iteratively loop and converge upon a solution to a specific design.

In the past, tire designers have used a design method that includes repetitive steps that has sometimes been both inaccurate and expensive. For example, tire designers create a tire model and run a finite element analysis of the model, receive a calculated residual aligning torque number as output, and then produce tooling from this design. With this tooling, tire designers produce experimental tires and then test the experimental tires to measure the residual aligning torque (among various other tire characteristics). Tire designers have not always been able to predict the measured residual aligning torque in the experimental tire. As a result, the designers may have to redesign the tire and the related tire tooling because the experimental tire has a measured residual aligning torque that varies significantly from the calculated residual aligning torque, resulting in delays in tire programs and increased costs.

SUMMARY

A method of designing a tire, wherein a tire designer identifies a target residual aligning torque range for a tire design and creates a computer model of the tire, including a buttress angle. Further, the method includes calculating the residual aligning torque of the modeled tire and comparing the calculated residual aligning torque value to the target residual aligning torque to determine whether the calculated residual aligning torque value is within the target residual aligning torque range. The method produces a final tire design having a target residual aligning torque.

BRIEF DESCRIPTION OF THE DRAWINGS

In the accompanying drawings, embodiments of a design method for optimizing residual aligning torque are illustrated that, together with the detailed description provided below, describe exemplary embodiments of the design method. One of ordinary skill in the art will appreciate that a step may be designed as multiple steps or that multiple steps may be designed as a single step.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

The following definitions are provided to aid in the understanding of the invention. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Bead" refers to the part of the tire that contacts the wheel and defines a boundary of the sidewall.

"Buttress portion" refers to the portion of a tire in the region outside of a footprint of the tire where the tread transitions into the sidewall. Tire designers will appreciate that the buttress portion includes various geometric attributes, including at least one buttress angle.

"Buttress angle" refers to an angle that the buttress portion is offset relative to a plane that contains the axis of rotation and intersects a point where the buttress portion meets the edge of the tread. Further, the buttress portion can be defined by a secondary angle that is offset relative to a plane parallel to the axis of rotation that intersects a point where the buttress portion meets the edge of the tread.

"Circumferential" and "circumferentially" refer to a direction extending along the perimeter of the surface of the annular tread.

"Equatorial plane" refers to the plane that is perpendicular to the tire's axis of rotation and passes through the center of the tire's tread.

"Footprint" refers to the area of the tread of the tire that makes contact with the ground.

"Lateral" refers to a direction along the tread of the tire going from one sidewall to the other sidewall.

"Radial" and "radially" refer to a direction perpendicular to the axis of rotation of the tire.

"Residual aligning torque" or "RAT" refers to a moment produced on a tread at the footprint when the lateral force equals zero that causes a moment about the z-axis on the tire, expressed in Newton-meter (N-m) or foot-pound (ft-lb).

"Sidewall" refers to that portion of the tire between the footprint of the tread and the bead, so the sidewall includes the buttress portion as defined above.

"Slope-top tie bar" refers to tie bars that extend circumferentially between adjacent tread blocks in a pair of circumferentially extending ribs located on opposite sides of a mid circumferential plane of the tire, wherein the tie bars are tapered in a first direction in one tire rib and tapered in an opposite direction in another tire rib.

"Tread" refers to that portion of the tire that comes into contact with the road under normal inflation and load.

The Society of Automotive Engineers J670e ("the SAE Standard") defines a coordinate system for a tire. The SAE Standard defines the +x-axis as pointing in a direction that is parallel with a tire's forward direction, the +y-axis as pointing to the right side of the tire's forward direction, and the +z-axis pointing towards the ground. The SAE Standard coordinate system is used herein when defining directional forces and moments on a tire.

To determine whether a tire design will meet customer requirements, a tire manufacturer will typically model a tire design, sometimes using finite element analysis. One of many customer requirements that the tire manufacturer must meet is a residual aligning torque or "RAT" range. Tire designers have traditionally tried to calculate RAT by modeling a portion of the tire tread at the footprint with the roadway, including tread characteristics: slot angles, sipes, and slope-top tie bars.

The inventors discovered that the tire's buttress portion and the buttress angle also have a significant impact on the RAT of the tire. Adjustments to the buttress angle can cause larger changes in RAT than many other tread characteristics and with fewer tire performance or aesthetic trade-offs. For example, the buttress angle can have a larger impact on RAT relative to slope-top tie bars or sipes. Further, there is less aesthetic impact when designers make a design change to the buttress angle than when designers make a design change to slot angles because the buttress angle change does not change the look of the tread pattern like a change to the slot angles. In addition, changes to the buttress angle do not change tire performance attributes like a change to other tire attributes that impact RAT. For example, a change to belt cord angles can impact RAT but also impacts the tire's cornering performance, while a change to the buttress angle has negligible impact on the tire's cornering performance.

Figure 1:
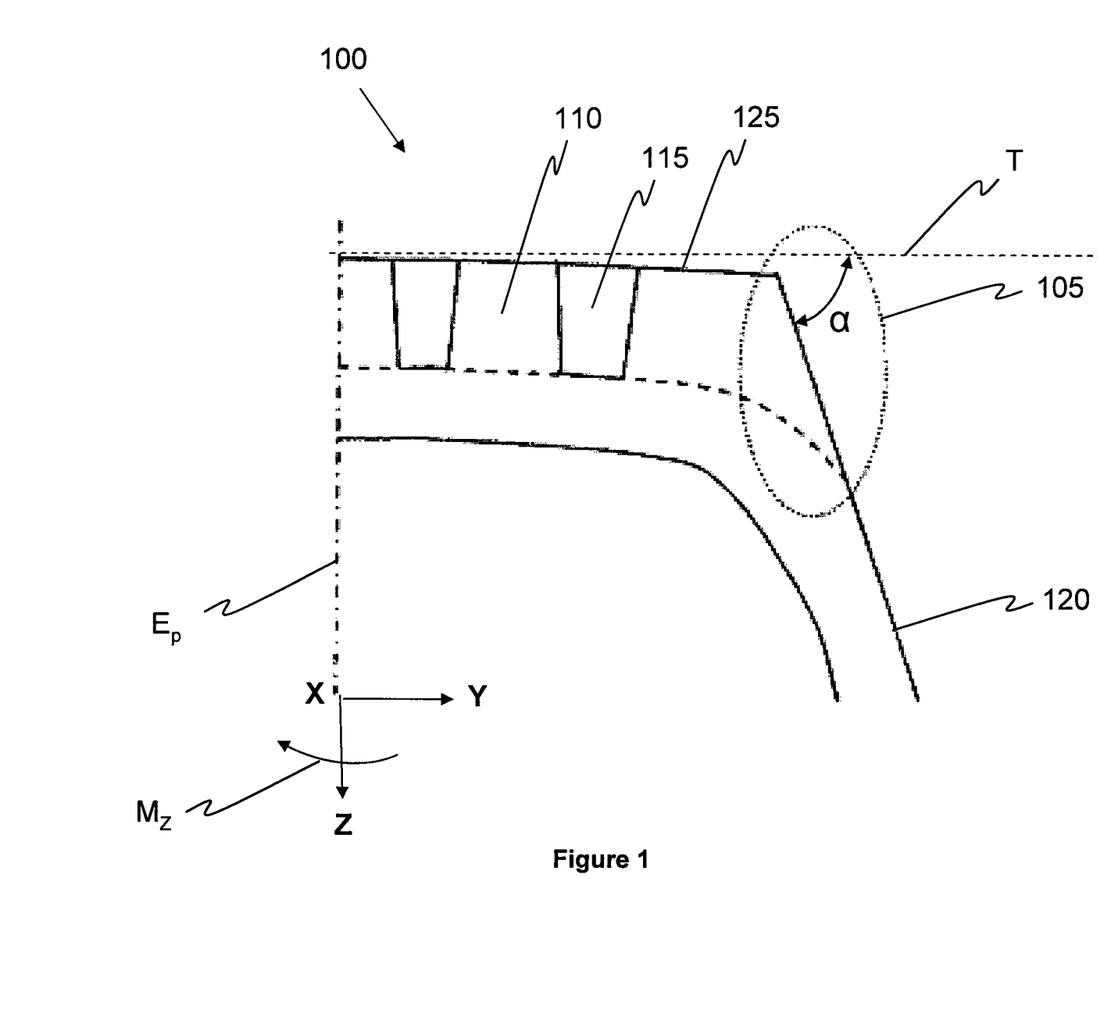
FIG. 1 illustrates a partial cross section of a tire 100 that includes a buttress portion 105.

The present application is directed to a method of designing a tire having a target residual aligning torque. In this method, inclusion of the buttress portion and the buttress angle significantly improves designers' accuracy in designing a tire having a target RAT, because the buttress region of the tire causes forces in the footprint of the tread that adds to RAT. FIG. 1 illustrates a partial cross section of an exemplary tire 100 that includes a buttress portion 105, which is indicated by the region within the dashed ellipse. The buttress portion is at an angle α relative a plane T that is parallel to the axis of rotation and that intersects a point where the buttress portion 105 meets the edge of the tread 110. For clarity, the angle α is the buttress portion's 105 secondary angle. Further, the tire 100 includes a tread 110 with at least one groove 115, a sidewall 120, and an equatorial plane $E_p$. The road contacting surface of the tread 110 is made from a plurality of tread lugs 125 that have surfaces that contact the road as the tire rotates. The tread lugs 125 may have square, rectangular or other geometric shaped surfaces that contact the road. In another exemplary tire (not shown), the tire does not include at least one groove 115.

With continued reference to FIG. 1, the buttress portion 105 is the portion of the tire in the region outside of a footprint of a tire where the tread 110 transitions to the sidewall 120. RAT is defined as a moment $M_z$ about the z-axis of a tire when a lateral force $F_y$ (not shown in FIG. 1) on the tire is equal to zero. In the illustrated embodiment, the moment $M_z$ is depicted as positive, but one skilled in the art would appreciate that the moment $M_z$ could be negative. RAT includes a conicity residual aligning torque ("CRAT") and a plysteer residual aligning torque ("PRAT"). CRAT and PRAT can be isolated during testing and a tire can be modeled to have CRAT equal to zero. For purposes of this application, RAT is assumed to be equal to PRAT.

Designers can model tires using manual and automated modeling techniques. Manual modeling techniques, including design guides, can be time consuming and inaccurate. So many designers use computer modeling techniques and related software systems to decrease the amount of time required to design and simulate new designs. One type of computer and software system that tire designers use to make tire models is finite element analysis ("F.E. Analysis"). A commonly used F.E. Analysis computer and software system is Abaqus.

Tire modeling techniques take into account geometric attributes of the tire. Tire modeling techniques also take into account the mechanical, thermal, and physical properties of the tire when designers specify the steel, elastomer, and rubber materials that make up the tire. Mechanical properties include at least one of the following: linear or non-linear stress-strain relationships, Poisson's ratio, viscoelasticity, and the like. Thermal properties include thermal conductivity, coefficient of thermal expansion, mechanical properties as a function of temperature, and the like. Physical properties include density and the like.

The buttress portion 105 of tire 100 and the buttress angle β directly affect RAT. Tire designs that include an accurate geometric representation of the buttress portion 105 with buttress angle β (shown below in FIG. 2A) can significantly increase designers' accuracy at designing a tire having a target RAT when tire designers input these accurate geometric representations into the tire model to calculate RAT. The buttress angle β is an angle that the buttress portion 105 is offset relative to a plane that contains the axis of rotation and intersects a point where the buttress portion meets the edge of the footprint. The buttress angle β is the buttress portion's 105 primary angle. Previous attempts at meeting RAT requirements focused on other geometric representations of tire characteristics, including slot angles, inclined sipes, and slope-top tie bars. When the tire tread contacts the road, there are force mechanisms at work that impact RAT. The buttress portion 105 and the buttress angle's β effect on RAT are due to two force mechanisms: a compression mechanism and a coupling shear stiffness mechanism. The other tire characteristics impact only one force mechanism, e.g., a slot angle only impacts the coupling shear stiffness mechanism, and slope-top tie bars and sipes only impact the compression mechanism.

Figure 2A:
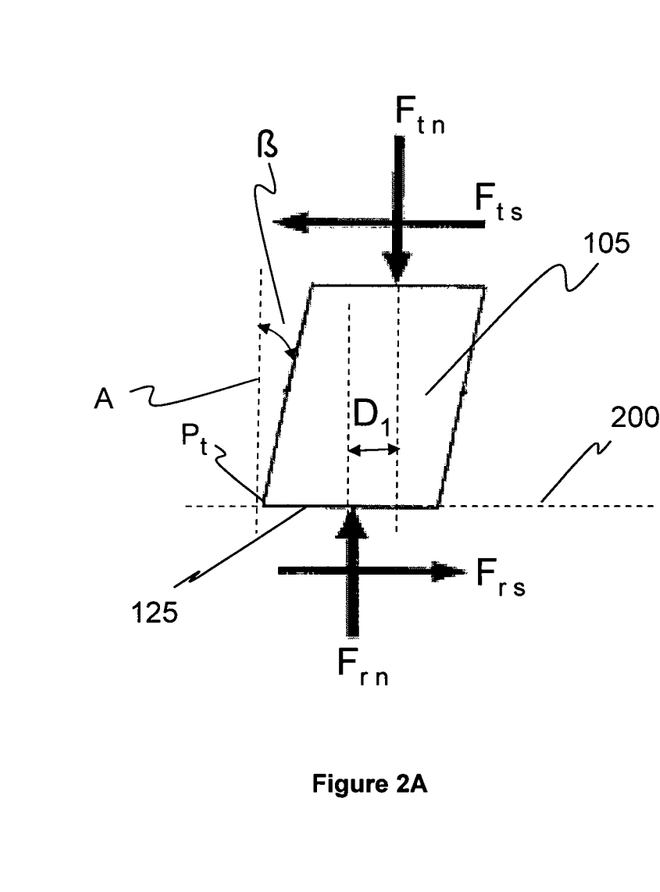
FIG. 2A illustrates a free body diagram of a lateral view of a buttress portion 105 of the tire 100 that includes a buttress angle β with an applied road normal force and several reactive forces.

A compression mechanism is illustrated in FIG. 2A. The illustration depicts a free body diagram of a lateral view of the buttress portion 105 and an adjacent tread lug 125 in contact with a road 200, showing the buttress portion 105 is at a representative angle β relative to a plane A. The representative angle β would be measured from a lateral point of view, as depicted in FIG. 2A. Plane A contains the tire's axis of rotation and intersects a point $P_t$ where the buttress portion 105 meets the edge of the tread 110 or the tread lug 125. Further, the illustration depicts an applied road normal force and several reactive forces. In the illustration, the road 200 applies a road normal force $F_{r\,n}$ that compresses the buttress portion 105 and the tread lug 125. The road normal force $F_{r\,n}$ is the driving force of the compression mechanism. In the illustration, a reactive set of forces from the tire counteracts the road normal force $F_{r\,n}$, including a tire normal force $F_{t\,n}$ and a tire shear force $F_{t\,s}$. In the illustration, a reactive road shear force $F_{r\,s}$ counteracts the tire shear force $F_{t\,s}$ and contributes to RAT. In the illustration, the road normal force $F_{r\,n}$ is offset a distance $D_1$ from the tire normal force $F_{t\,n}$, and the offset of these forces creates a moment (not shown). The tire shear force $F_{t\,s}$ and the road shear force $F_{r\,s}$ develop to balance the moment generated from these offset normal forces. The road shear force $F_{r\,s}$ can be either a force in the same direction of tire travel or a force in a direction opposite of tire travel. The road shear force $F_{r\,s}$ on one side of the tire 100 combines with the road shear force $F_{r\,s}$ on the other side of the tire to add to or subtract from a total RAT (discussed below). If the buttress angle β is zero, then the road normal force $F_{r\,n}$ and the tire normal force $F_{t\,n}$ would not be offset by a distance $D_1$. In that event, the moment and the reactive forces ($F_{t\,s}$, $F_{r\,s}$) would not be generated and the buttress portion 105 and the buttress angle β would have no impact on RAT.

Figure 2B:
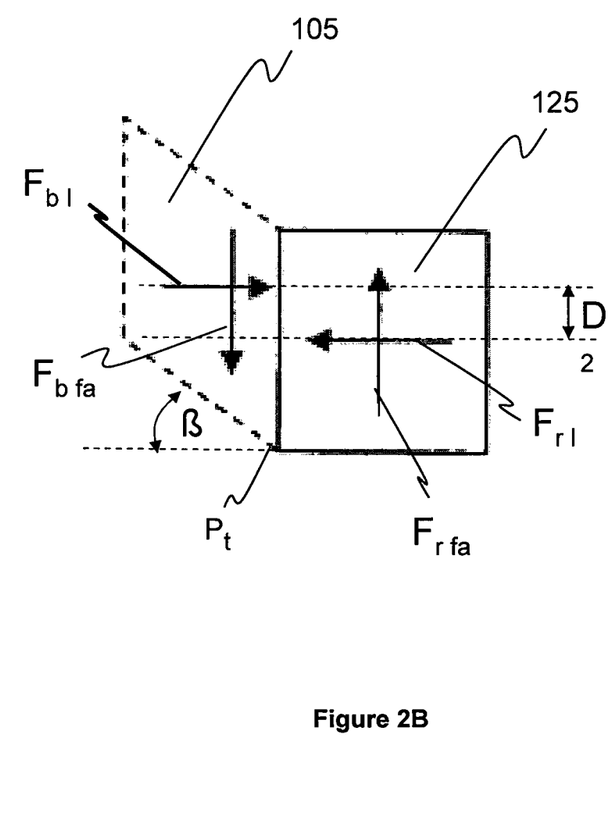
FIG. 2B illustrates a free body diagram of a radial view of the tread lug 125 including a buttress portion 105 with an applied lateral road force and several reactive forces.

A coupling shear stiffness mechanism is shown in FIG. 2B. The illustration depicts a free body diagram of a radial view of the buttress portion 105, adjacent tread lug 125, and an oblique view of the buttress angle β. Further, the illustration depicts an applied lateral road force and several reactive forces. In the illustration, the tread lug 125 and the buttress portion 105 are subject to a road lateral force $F_{r\,l}$, and the buttress portion 105 provides a reactive buttress lateral force $F_{b\,l}$ that acts upon tread lug 125. The road lateral force $F_{r\,l}$ is a force generated by a rolling tire when the round tire flattens as it makes contact with the road. The road lateral force $F_{r\,l}$ is offset a distance $D_2$ from the buttress lateral force $F_{b\,l}$, and this offset creates a moment (not shown). As a result of this moment, a reactive road fore or aft force $F_{r\,fa}$ and a reactive buttress fore or aft force $F_{b\,fa}$ develop on the tread lug 125 to counter-balance the moment. If the buttress angle β (shown in FIG. 2A) is zero, then the road lateral force $F_{r\,l}$ and the buttress lateral force $F_{b\,l}$ would not be offset by a distance $D_2$. In that event, the moment and the reactive forces ($F_{b\,fa}$, $F_{r\,fa}$) would not be generated and, as discussed above, the buttress portion 105 and the buttress angle β would have no impact on RAT.

Figure 3:
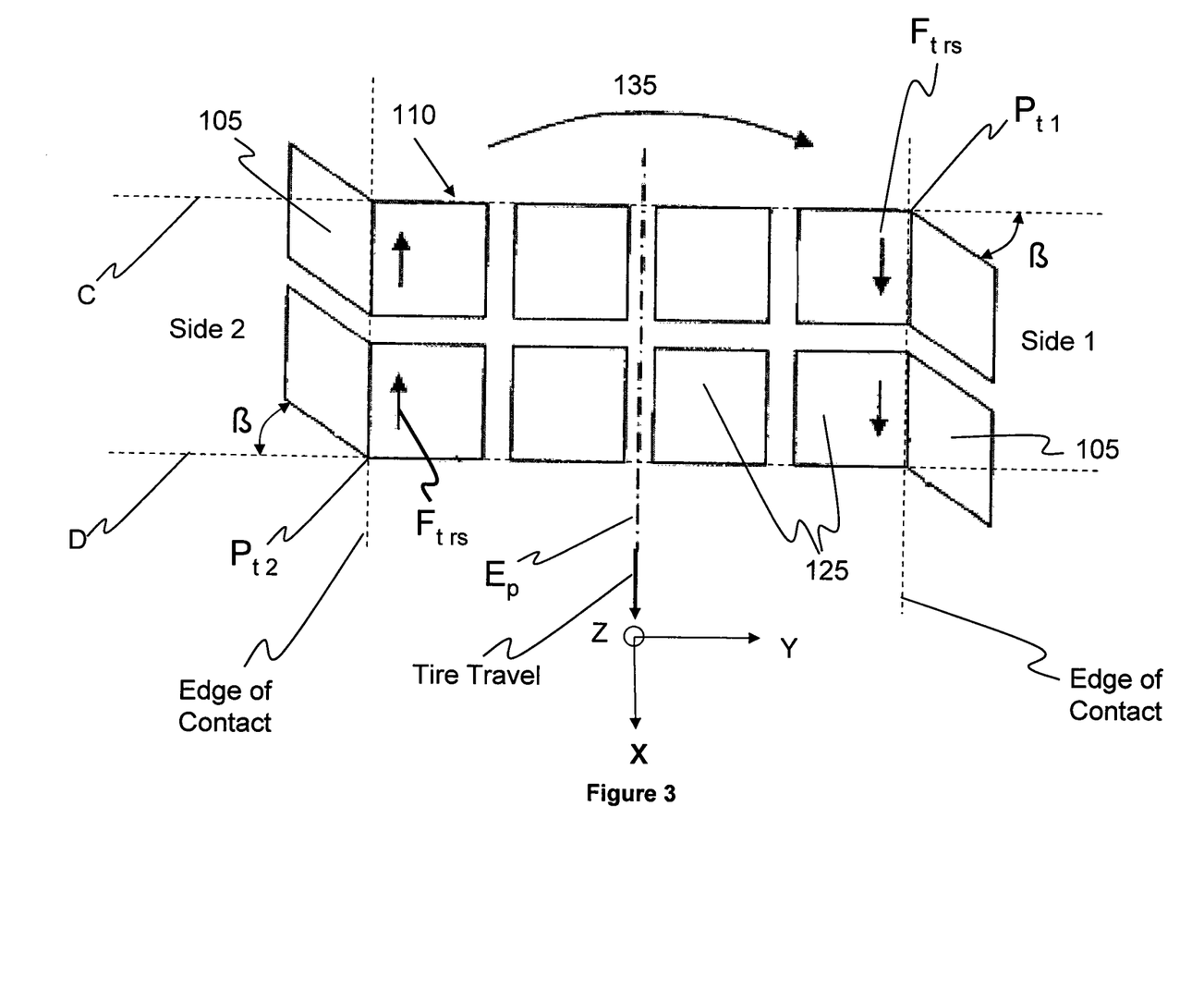
FIG. 3 illustrates a top or a radial view of a tread 110 of the tire 100 with buttress portions 105 on each side thereof.

FIG. 3 illustrates a top or radial view of the tire tread 110 with tread lugs 125 and with buttress portions 105 on each side of the tire (e.g., a Side 1 and a Side 2). In the illustration, planes C and D contain the axis of rotation and intersect points $P_{t1}$ and $P_{t2}$, respectively, where the buttress portions 105 meet the edge of the tread 110 of the tire 100. In the illustration, an oblique view of the buttress angle β is shown on each side of the equatorial plane $E_p$ and slant in opposite directions of each other, e.g., on Side 1 the buttress angle β is slanted relative to the plane C towards the direction of tire travel and on Side 2 the buttress angle β is slanted relative to the plane D in a direction opposite of tire travel. In another design (not shown), the buttress angles β on Side 1 and Side 2 can be one of the following: about the same angle relative to the planes C and D, respectively, and a different angle relative to the planes C and D, respectively. In yet another design (not shown), the buttress angles β on Side 1 and Side 2 slant in the same direction relative to planes C and D, respectively, e.g., both towards the direction of the travel or both opposite the direction of tire travel. In another design (not shown), the buttress angles β on Side 1 and Side 2 are at different angles. In another design (not shown), the buttress portions 105 on Side 1 and Side 2 have at least one of the following characteristics: geometric properties or attributes that are substantially similar to each other and geometric properties or attributes that are not substantially similar to each other. If the buttress angles β on Side 1 and Side 2 slant in the same direction relative to planes C and D, respectively, and have substantially similar magnitudes, then there may be zero effect on RAT, but a designer may desire this in order to obtain a target RAT for the tire.

FIG. 3 shows the result of both the compression mechanism and the shear coupling stiffness mechanism, illustrated in FIGS. 2A-2B. From these mechanisms, a tire reactive shear force $F_{t\,rs}$ forms near each edge of the tire's 100 footprint and combine to form a buttress angle contribution to RAT 135. In the illustrated embodiment, the buttress angle contribution to RAT 135 is depicted as negative, but tire designers would appreciate that the buttress contribution to RAT 135 could be positive. Since the buttress angle β creates the tire reaction shear force $F_{t\,rs}$ and that force contributes directly to a total RAT (not shown), designers can increase or decrease the angle β to vary the calculated total RAT. Similarly, the buttress portion 105 and its related geometry and orientation contribute to the location and the magnitude of the reaction shear force $F_{t\,rs}$ and the buttress angle contribution to RAT 135. Further, tire designers can vary the buttress portion 105 and the buttress angle β without changing the tread pattern, so there are minimal trade-offs in tire performance or tire aesthetics when designers make changes to the buttress portion 105 and the buttress angle β.

Figure 4:
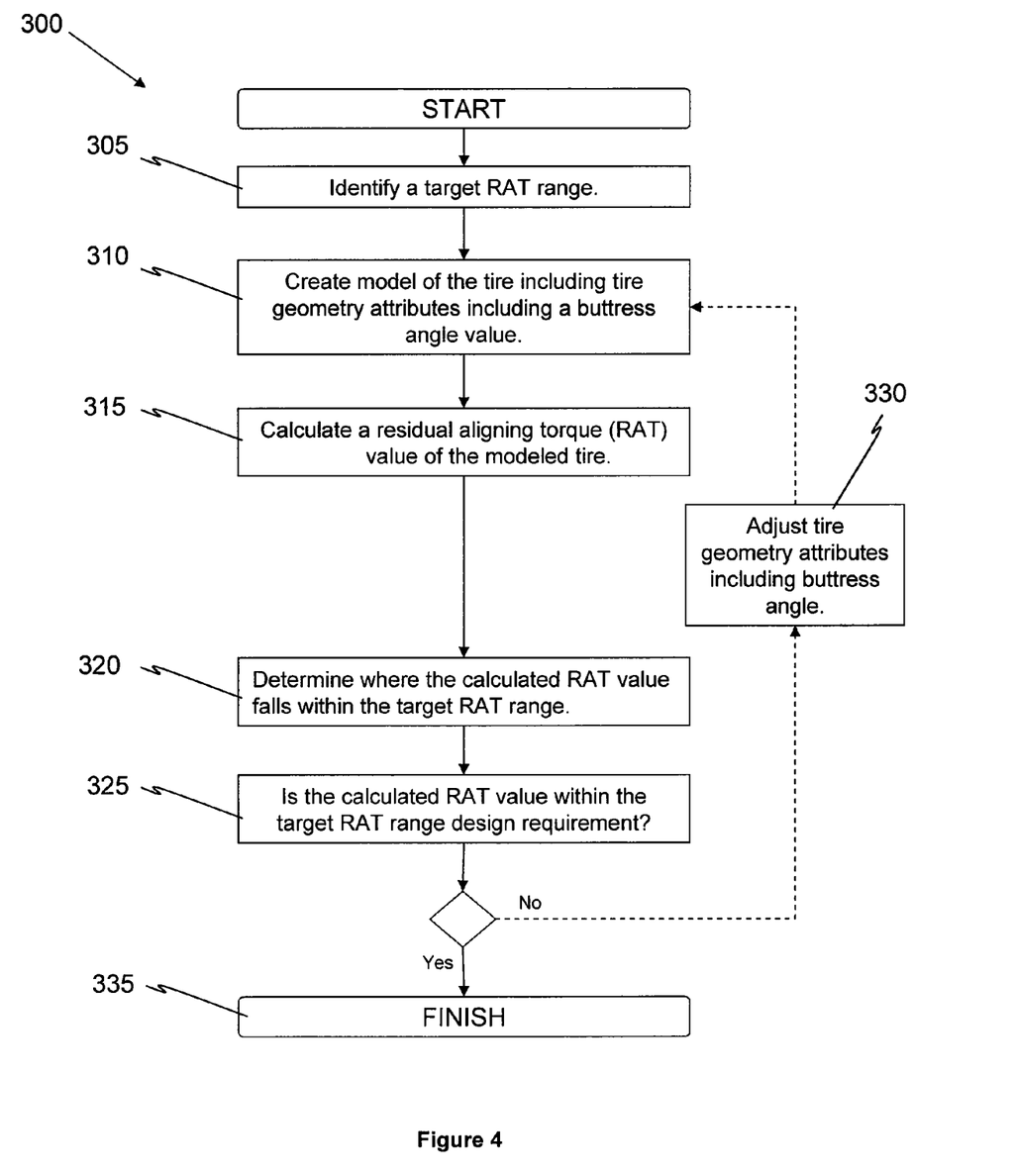
FIG. 4 illustrates a flow chart of one embodiment of a design method to design a tire having a target residual aligning torque 300.

FIG. 4 illustrates steps of a design method 300 that enhances the ability of tire designers to design a tire that designers predict will meet the target RAT. Those skilled in the art will appreciate that target residual aligning torque ranges vary with different tires. As shown in FIG. 4, a target RAT range is identified at step 305 of the method. The next step is to create a computer model of the tire including tire geometrical attributes that include a buttress angle value or values at step 310. After a model of the tire is created, the residual aligning torque value of the modeled tire is calculated at step 315. Once the calculated RAT is known, step 320 is executed to compare the calculated RAT and a further step 325 is then executed to determine whether the calculated RAT falls within the target RAT range. If the calculated RAT falls within the target RAT range as determined during step 325, then the design method is completed at step 335. If the calculated RAT is not within the target RAT range at step 325, then the tire geometrical attributes including the buttress angle are adjusted at 330 by the tire designer and steps 310 through 325 are repeated until the calculated RAT value is within the target RAT at 325, and then the tire design is finished at 335. Through this iterative process, a tire designer can more efficiently produce a tire design that will conform to RAT requirements.

Figure 5:
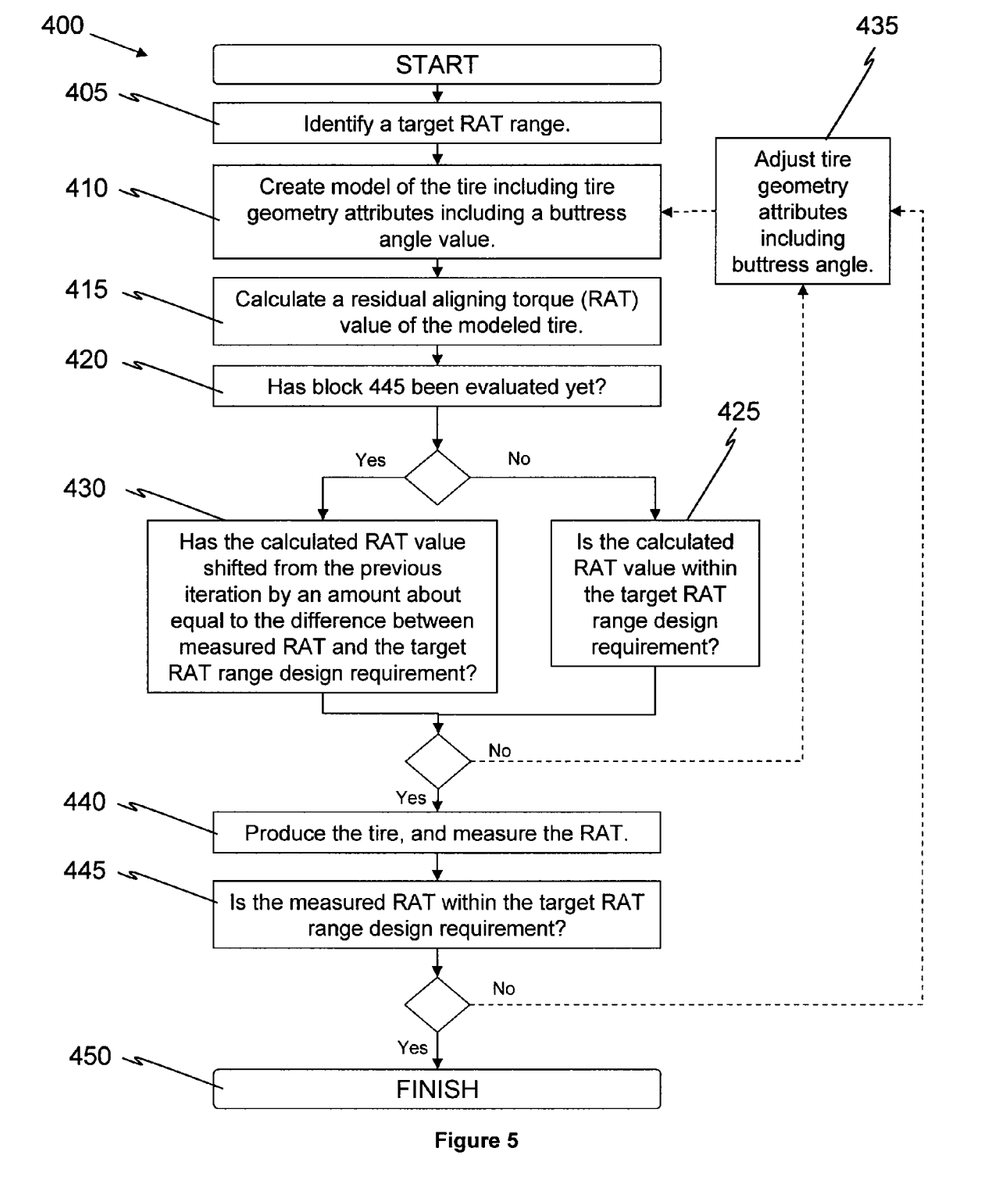
FIG. 5 illustrates a flow chart of one embodiment of an alternative embodiment of a design method to design a tire having a target residual aligning torque 400.

FIG. 5 illustrates steps of an alternative design method 400. As shown in FIG. 5, a target RAT range is identified at step 405 of the method. The next step is to create a computer model of the tire including tire geometrical attributes that include a buttress angle value or values at step 410. After a model of the tire is created, the residual aligning torque value of the modeled tire is calculated at step 415. Once the calculated RAT is known, the method 400 determines whether a tire has been produced and if a measured RAT from a physical tire has already been obtained at step 420. If the method 400 has not already produced a tire and obtained a measured RAT, then the method determines whether the calculated RAT value is within the target RAT design requirement at step 425. If the method 400 has already produced a tire and obtained a measured RAT, then the method 400 determines whether the calculated RAT value shifted from the previous iteration by an amount equal to the difference between the measured RAT and the target RAT range design requirement. If steps 425 or 430 are resolved in the affirmative, then the method proceeds to produce a tire at step 440 and measures the tire's RAT and determines if the measured RAT is within the target RAT range at step 445. If step 425 is not resolved in the affirmative, then the tire designer adjusts the tire geometry attributes including the buttress angle at step 435 and steps 410 through 425 are repeated. If the step 430 is not resolved in the affirmative, then the tire designer adjusts the tire geometry attributes including the buttress angle at step 435 and steps 410 through 430 are repeated until the calculated RAT value shift is equal to the difference between the measured RAT and the target RAT range at step 430, and then another tire is produced at step 440. At step 445, the method measures RAT of the tire and determines whether the measured RAT is within the target RAT range. If the measured RAT is within the target RAT range, then the tire design is finished at 450. If the measured RAT is not within the target RAT range, then the tire geometry attributes including the buttress angle are adjusted at step 435 by the tire designer and steps 410 through 430 are repeated until the calculated RAT value shift is equal to the difference between the measured RAT and the target RAT range at step 430. At that point, another tire is produced at step 440 and if the measured RAT is within the target RAT at step 445 then the tire design is finished at step 445.

The following examples listed in Table A depict exemplary effects of including the buttress angle β in a tire modeling system and should not be construed as limiting the scope or spirit of the present application.

TABLE A

|  | Tire 1 (square shoulder) | Tire 2 (square shoulder) | Tire 3 (rounded shoulder) |
|---|---|---|---|
| Buttress Angle | +16 degrees | −15 degrees | +45 degrees |
| Calculated RAT without BA | −10.8 N-m | −8.4 N-m | −0.5 N-m |
| Calculated RAT with BA | −8.5 N-m | −12.2 N-m | +0.3 N-m |
| Measured RAT with BA | −9.0 N-m | −10.7 N-m | +0.3 N-m |
| Buttress Effect | +2.3 N-m | −3.8 N-m | +0.8 N-m |

Table A lists calculated RAT for various tires, tires 1-3. The table includes: buttress angle, calculated RAT for the tire design with a buttress angle of zero (without a buttress angle), calculated RAT for the tire design with a buttress angle, measured RAT with a buttress angle, and buttress effect. A buttress effect is the difference in calculated RAT between a tire design with a buttress angle and the same tire design with a buttress angle of zero. The table illustrates that a positive buttress angle results in a positive buttress effect, and a negative buttress angle results in a negative buttress effect. Further, the calculations with the buttress angle are more accurate compared to the calculations without a buttress angle or with a buttress angle of zero.

A process to physically measure RAT on a tire is well known in the tire industry. In the RAT measuring process, a technician attaches a tire to a machine that simulates a flat track or flat road surface. The machine includes a tire carriage that is attached to a frame structure. In addition, measurement devices, including force and torque measurement devices, are attached to the machine. The tire makes contact with a continuous belt that provides a simulated road surface and applies a specified vertical force to the tire. The tire is steered through a range of slip angles while the machine measures a lateral force and an aligning moment at each slip angle. The measurement data is collected and stored, and then a curve fit program is used to fit the measurement data and produce two curves: a lateral force versus a slip angle curve and an aligning moment versus a slip angle curve. RAT is the value of the aligning moment when the lateral force equals zero. Additionally, CRAT and PRAT contributions to RAT can be separated by running the tire in both directions.

Tire 1, a P235/75R15 tire with a square shoulder and a +16 degree buttress angle, having a maximum allowable inflation of 35 psi and a maximum allowable load of 2028 lb, was inflated to 35 psi and loaded with 1622 lb. Designers characterize a tire with a buttress angle that tends to make RAT more positive as having a positive buttress angle. When physically tested for RAT, tire 1 had a measured RAT of −9.0 N-m. The computer model of tire 1 with the buttress angle of zero (or without a buttress angle) produced a calculated RAT of −10.8 N-m, while the computer model of tire 1 with the buttress angle produced a calculated RAT of −8.5 N-m. For tire 1, the buttress effect on RAT is +2.3 N-m and its calculated RAT with the buttress angle was closer to its measured RAT, relative to its calculated RAT without the buttress angle.

Tire 2, a P235/75R15 tire with a square shoulder and a −15 degree buttress angle, having a maximum allowable inflation of 35 psi and a maximum allowable load of 2028 lb, was inflated to 35 psi and loaded with 1622 lb. Designers characterize a tire with a buttress angle that tends to make RAT more negative as having a negative buttress angle. When physically tested for RAT, tire 2 had a measured RAT of −10.7 N-m. The computer model of tire 2 with the buttress angle of zero produced a calculated RAT of −8.4 N-m, while the computer model of tire 2 with the buttress angle produced a calculated RAT of −12.2 N-m. For tire 2, the buttress effect on RAT is −3.8 N-m and, similar to tire 1, its calculated RAT with the buttress angle was closer to its measured RAT, relative to its calculated RAT without the buttress angle. Further, the negative buttress effect corresponds to the negative buttress angle of Tire 2.

Tire 3, a P255/70R18 tire with a rounded shoulder and a +45 degree buttress angle, having a maximum allowable inflation of 35 psi and a maximum allowable load of 2469 lb, was inflated to 35 psi and loaded with 1808 lb. When physically tested for RAT, tire 3 had a measured RAT of +0.3 N-m. The computer model of tire 3 with the buttress angle of zero produced a calculated RAT of −0.5 N-m, while the computer model of tire 3 with the buttress angle produced a calculated RAT of +0.3 N-m. For tire 3, the buttress effect on RAT is +0.8 N-m and, similar to tire 1, its calculated RAT with the buttress angle was closer to its measured RAT, relative to its calculated RAT without the buttress angle. Further, the positive buttress effect of Tire 3 corresponds to a positive buttress angle of Tire 3.

From these three tires, inclusion of the buttress angle β in the tire model altered RAT calculations from an absolute range of 0.8 N-m to 3.8 N-m. A designer's ability to optimize RAT improves when using the buttress angle β in the tire model, because the buttress angle and the buttress portion's geometric attributes provide designers with tire characteristics that directly affect RAT.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A method of designing a tire having a circumferential tread, the method comprising:
   identifying a target residual aligning torque range for a tire having a buttress portion and a non-zero buttress angle ($\beta$) on each side of the tire, wherein the buttress portion extends from a sidewall of the tire to an outer boundary of the circumferential tread, and wherein the non-zero buttress angle ($\beta$) is an angle between the buttress portion and a plane that contains an axis of rotation of the tire; creating a computer model of the tire that includes the non-zero buttress angle ($\beta$) comprising:
      generating, based on a compression mechanism applied to the computer model of the tire with the non-zero buttress angle ($\beta$), a tire shear force ($F_{ts}$) and a road shear force ($F_{rs}$) to balance a moment created from a road normal force ($F_{r,n}$) which is offset at a distance ($D_1$) to a counteractive tire normal force ($f_{tn}$);
      generating, based on a coupling shear stiffness mechanism applied to the computer model of the tire with the non-zero buttress angle ($\beta$), a reactive buttress fore or aft force ($F_{bfa}$) and a reactive road fore or aft force ($F_{rba}$) to balance a moment created from a road lateral force ($F_{rl}$), which is offset at a distance ($D_2$) to a reactive buttress lateral force ($F_{bl}$); and
      generating a tire reactive shear force (Ftrs) at an edge of the tire footprint based on the compression mechanism and the coupling shear stiffness mechanism;
   calculating a residual aligning torque of the computer model of the tire with the non-zero buttress angle ($\beta$), the calculated residual aligning torque being based on the tire reactive shear force ($F_{trs}$), which includes the effects of the non-zero buttress angle ($\beta$);
   comparing the calculated residual aligning torque value to the target residual aligning torque range;
   determining whether the calculated residual aligning torque value is within the target residual aligning torque range;
   adjusting the tire reactive shear force by adjusting the non-zero buttress angle ($\beta$), which changes the tire reactive shear force ($F_{trs}$) in the computer model of the tire with the non-zero buttress angle ($\beta$);
   repeating the calculating, comparing, determining, and adjusting until the calculated residual aligning torque value is within the target residual aligning torque range; and
   producing a final tire design.

2. The method of claim 1, wherein the tire geometrical attributes further include at least one of: a slot angle, an inclined sipe, and a slope-top tie bar.

3. The method of claim 1, wherein the computer model of the tire is a finite element model.

4. The method of claim 3, further comprising including tire material properties in the finite element model.

5. The method of claim 4, wherein the tire material properties include mechanical properties, including at least one of: linear stress-strain relationships, nonlinear stress-strain relationships, density, Poisson's ratio, and viscoelasticity.

6. The method of claim 4, wherein the tire material properties include thermal properties, including at least one of: thermal conductivity and coefficient of thermal expansion.

7. The method of claim 1, further comprising designing a buttress angle on a first side of the tire that is oriented in an opposite direction of a buttress angle on a second side of the tire.

8. The method of claim 7, wherein the buttress angle on the first side of the tire is substantially the same as the buttress angle on the second side of the tire.

9. The method of claim 7, wherein the buttress angle on the first side of the tire is different from the buttress angle on the second side of the tire.

10. The method of claim 7, wherein a buttress portion on the first side of the tire has a geometrical shape different from a buttress portion on the second side of the tire.

11. The method of claim 1, further comprising designing a buttress angle on a first side of the tire that is oriented in a same direction of a buttress angle on a second side of the tire.

12. The method of claim 11, wherein the buttress angle on the first side of the tire is substantially equal to the buttress angle on the second side of the tire.

13. The method of claim 11, wherein the buttress angle on the first side of the tire is different from the buttress angle on the second side of the tire.

14. A method of designing a tire having a circumferential tread and a pair of buttress portions, each buttress portion extending from a sidewall of the tire to an outer boundary of the circumferential tread, the method comprising:
   identifying a target residual aligning torque range for a tire;
   creating a computer model of the tire, including:
      selecting a non-zero buttress angle ($\beta$) for each buttress portion, wherein the non-zero buttress angle ($\beta$) is an angle between the buttress portion and a plane that contains an axis of rotation of the tire;
      generating, based on a compression mechanism applied to the computer model of the tire with the non-zero buttress angle ($\beta$), a tire shear force ($F_{ts}$) and a road shear force ($F_{rs}$) to balance a moment created from a road normal force ($F_{rn}$) which is offset at a distance ($D_1$) to a counteractive tire normal force ($F_{tn}$);
      generating, based on a coupling shear stiffness mechanism applied to the computer model of the tire with the non-zero buttress angle ($\beta$), a reactive buttress fore or aft force ($F_{bfa}$) and a reactive road fore or aft force ($F_{rba}$) to balance a moment created from a road lateral force ($F_{rl}$), which is offset at a distance ($D_2$) to a reactive buttress lateral force ($F_{bl}$); and
      generating a tire reactive shear force ($F_{trs}$) at an edge of the tire footprint based on the compression mechanism and the coupling shear stiffness mechanism;
   calculating a residual aligning torque of the computer model of the tire, the calculated residual aligning torque being based on the tire reactive shear force ($F_{trs}$), which includes the effects of the non-zero buttress angle ($\beta$);

comparing the calculated residual aligning torque value to the target residual aligning torque range;
determining whether the calculated residual aligning torque value is within the target residual aligning torque range;
adjusting the tire reactive shear force ($F_{trs}$) by adjusting the non-zero buttress angle ($\beta$), which changes the tire reactive shear force ($F_{trs}$) in the computer model of the tire with the non-zero buttress angle ($\beta$) and repeating the calculating, comparing, determining, and the adjusting until the adjusted calculated residual aligning torque is within the target residual aligning torque range;
producing a tire;
measuring a residual aligning torque of the produced tire;
determining whether the measured residual aligning torque value is within the target residual aligning torque range.

15. The method of claim 14, further comprising:
adjusting at least one of the buttress angles in the computer model based on a determination that the measured residual aligning torque value does not fall within the target residual aligning torque range;
producing an adjusted tire;
measuring a residual aligning torque value of the adjusted tire; and
comparing the measured residual aligning torque value of the adjusted tire to the target residual aligning torque and repeating the adjusting, producing, and measuring steps until the measured residual aligning torque of the adjusted tire is within the target residual aligning torque range.

16. The method of claim 14, further comprising producing a final tire design.

17. The method of claim 14, wherein the selecting a buttress angle includes selecting a buttress angle on a first side of the tire that is oriented in an opposite direction of a buttress angle on a second side of the tire.

18. The method of claim 14, wherein the selecting a buttress angle includes selecting a buttress angle on a first side of the tire that is substantially equal to a buttress angle on a second side of the tire.

19. The method of claim 14, wherein the selecting a buttress angle includes selecting a buttress angle on a first side of the tire that is different from a buttress angle on a second side of the tire.

20. A method of designing a tire, the method comprising:
identifying a target residual aligning torque range for a tire having a circumferential tread and a pair of buttress portions, each buttress portion extending from a sidewall of the tire to an outer boundary of the circumferential tread and forming a non-zero buttress angle ($\beta$) with a plane that contains an axis of rotation of the tire;
selecting the non-zero buttress angle ($\beta$) on each side of the tire;
creating a computer model of the tire that includes the non-zero buttress angle ($\beta$), including:
generating, based on a compression mechanism applied to the computer model of the tire with the non-zero buttress angle ($\beta$), a tire shear force ($F_{ts}$) and a road shear force ($F_{rs}$) to balance a moment created from a road normal force ($F_{rn}$) which is offset at a distance ($D_1$) to a counteractive tire normal force ($F_{tn}$);
generating, based on a coupling shear stiffness mechanism applied to the computer model of the tire with the non-zero buttress angle ($\beta$), a reactive buttress fore or aft force ($F_{bfa}$) and a reactive road fore or aft force ($F_{rba}$) to balance a moment created from a road lateral force ($F_{rl}$), which is offset at a distance ($D_2$) to a reactive buttress lateral force ($F_{bl}$); and
generating a tire reactive shear force ($F_{trs}$) at an edge of the tire footprint based on the compression mechanism and the coupling shear stiffness mechanism;
calculating a residual aligning torque of the computer model of the tire, the calculated residual aligning torque being based on the tire reactive shear force ($F_{trs}$), which includes the effects of the non-zero buttress angle ($\beta$);
comparing the calculated residual aligning torque value to the target residual aligning torque range;
determining whether the calculated residual aligning torque value is within the target residual aligning torque range;
adjusting the tire reactive shear force ($F_{trs}$) by adjusting the non-zero buttress angle ($\beta$) on at least one side of the tire, which changes the tire reactive shear force ($F_{trs}$) in the computer model of the tire with the non-zero buttress angle ($\beta$);
repeating the calculating, comparing, determining, and adjusting until the calculated residual aligning torque value is within the target residual aligning torque range; and
producing a final tire design.

* * * * *

UNITED STATES PATENT AND TRADEMARK OFFICE
CERTIFICATE OF CORRECTION

| | | |
|---|---|---|
| PATENT NO. | : 8,447,578 B2 | Page 1 of 1 |
| APPLICATION NO. | : 12/436298 | |
| DATED | : May 21, 2013 | |
| INVENTOR(S) | : Coe et al. | |

It is certified that error appears in the above-identified patent and that said Letters Patent is hereby corrected as shown below:

In the Claims

In column 9, line 37, delete "Fr,n" and insert -- $F_{r,n}$ --.

In column 9, line 46, delete "Ftrs" and insert -- $F_{trs}$ --.

Signed and Sealed this
Second Day of June, 2015

Michelle K. Lee
*Director of the United States Patent and Trademark Office*